(12) United States Patent
Mastrocola et al.

(10) Patent No.: US 11,724,795 B2
(45) Date of Patent: Aug. 15, 2023

(54) ACTUATOR ASSEMBLY

(71) Applicant: Hamilton Sundstrand Corporation, Charlotte, NC (US)

(72) Inventors: Naison E. Mastrocola, Goshen, CT (US); Richard A. Poisson, Avon, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 295 days.

(21) Appl. No.: 17/222,114

(22) Filed: Apr. 5, 2021

(65) Prior Publication Data

US 2021/0300525 A1    Sep. 30, 2021

Related U.S. Application Data

(62) Division of application No. 15/687,592, filed on Aug. 28, 2017, now Pat. No. 11,001,372.

(51) Int. Cl.
| | |
|---|---|
| *B64C 13/50* | (2006.01) |
| *H02K 41/03* | (2006.01) |
| *H02K 7/116* | (2006.01) |
| *H02K 7/10* | (2006.01) |
| *F16H 25/22* | (2006.01) |
| *F16H 37/04* | (2006.01) |
| *F16H 37/06* | (2006.01) |
| *F16H 1/28* | (2006.01) |
| *H02K 7/06* | (2006.01) |

(52) U.S. Cl.
CPC ......... *B64C 13/50* (2013.01); *F16H 25/2204* (2013.01); *H02K 7/1004* (2013.01); *H02K 7/1166* (2013.01); *H02K 41/031* (2013.01); *H02K 41/033* (2013.01); *F16H 1/28* (2013.01); *F16H 37/041* (2013.01); *F16H 37/065* (2013.01); *H02K 7/06* (2013.01); *H02K 7/116* (2013.01)

(58) Field of Classification Search
CPC ......... H02K 41/031; H02K 41/03–033; H02K 7/1004–1016; H02K 7/116–1166; B64C 13/50; B64C 13/503
See application file for complete search history.

(56) References Cited

U.S. PATENT DOCUMENTS

| | | |
|---|---|---|
| 4,803,387 A | 2/1989 | Seider |
| 6,943,465 B2 | 9/2005 | Kim et al. |
| 7,456,526 B2 | 11/2008 | Teramachi et al. |
| 7,615,894 B1 | 11/2009 | Deal |

(Continued)

FOREIGN PATENT DOCUMENTS

| | | |
|---|---|---|
| EP | 0134827 | 3/1985 |
| EP | 2052968 | 4/2009 |

(Continued)

OTHER PUBLICATIONS

European Search Report for European Application No. 18191188 completed Jan. 23, 2019.

*Primary Examiner* — Erin D Bishop
(74) *Attorney, Agent, or Firm* — Carlson, Gaskey & Olds, P.C.

(57) ABSTRACT

An actuation assembly includes a drive mechanism that has an array of magnetic members moveable along an axis, and a gear train that has an input and an output. The drive mechanism causes the input to move in response to generating an electromagnetic field that interacts with at least one of the array of magnetic members.

20 Claims, 6 Drawing Sheets

(56) References Cited

U.S. PATENT DOCUMENTS 7,737,591 B2 6/2010 Himmelmann et al.
8,143,750 B2 3/2012 Aso et al.
8,286,935 B2 10/2012 White
9,995,288 B2 6/2018 Safai et al.

FOREIGN PATENT DOCUMENTS

| EP | 2345579 | 7/2011 |
| EP | 3091646 | 11/2016 |
| EP | 3199807 | 8/2017 |
| JP | 2000095176 | 4/2000 |

ACTUATOR ASSEMBLY

CROSS-REFERENCE TO RELATED APPLICATIONS

This application is a divisional of U.S. patent application Ser. No. 15/687,592, filed on Aug. 28, 2017.

BACKGROUND

The present disclosure relates to actuators, and more particularly to actuation of aircraft components.

Aircraft typically include one or more pivotable flaps. Each flap may be driven by a linear motor to provide a desired control of the aircraft. The flaps may be located adjacent to relatively small clearances or spaces, such as outer portions of aircraft wings. The linear actuator may be constrained by the relatively small clearances or spaces.

SUMMARY

An actuation assembly according to an example of the present disclosure includes a drive mechanism that has an array of magnetic members moveable along an axis, and a gear train that has an input and an output. The drive mechanism causes the input to move in response to generating an electromagnetic field that interacts with at least one of the array of magnetic members. A method of actuating an aircraft component is also disclosed.

Although the different embodiments have the specific components shown in the illustrations, embodiments of this disclosure are not limited to those particular combinations. It is possible to use some of the components or features from one of the embodiments in combination with features or components from another one of the embodiments.

The various features and advantages of this invention will become apparent to those skilled in the art from the following detailed description of an embodiment. The drawings that accompany the detailed description can be briefly described as follows.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION

Figure 1:
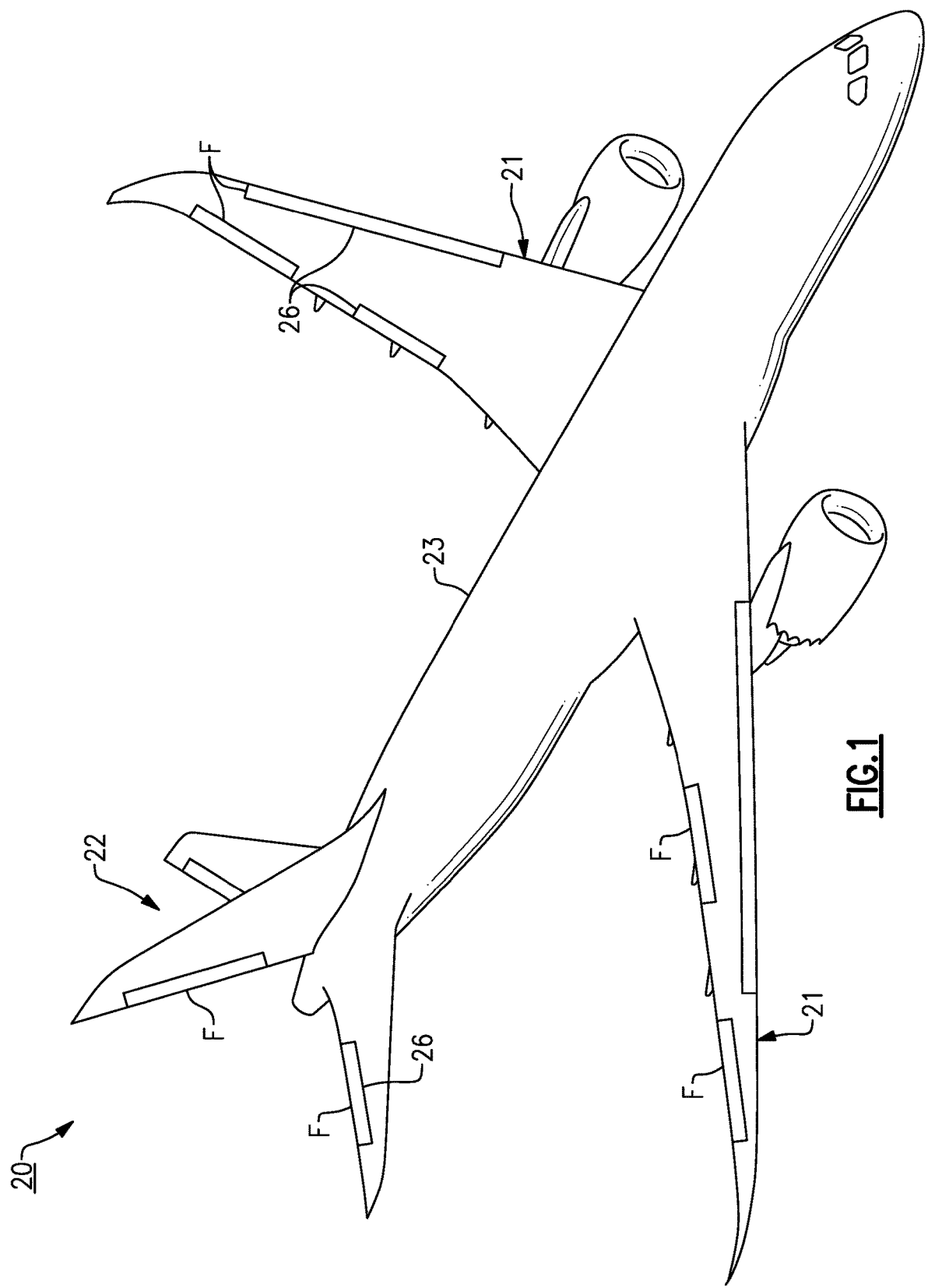
FIG. 1 shows an exemplary aircraft.

FIG. 1 illustrates an aircraft 20 according to an example. The aircraft 20 includes a pair of wings 21 and a tail section 22 that extend from a fuselage 23. The aircraft 20 includes one or more mechanical loads 26, such as one or more pivotable flaps F. The pivotable flaps F can be located along a portion of one or more of the wings 21 and/or the tail section 22 to augment control of the aircraft 20. Example flaps include ailerons, elevators, rudders, spoilers, and leading edge flaps and slats.

Figure 2A:
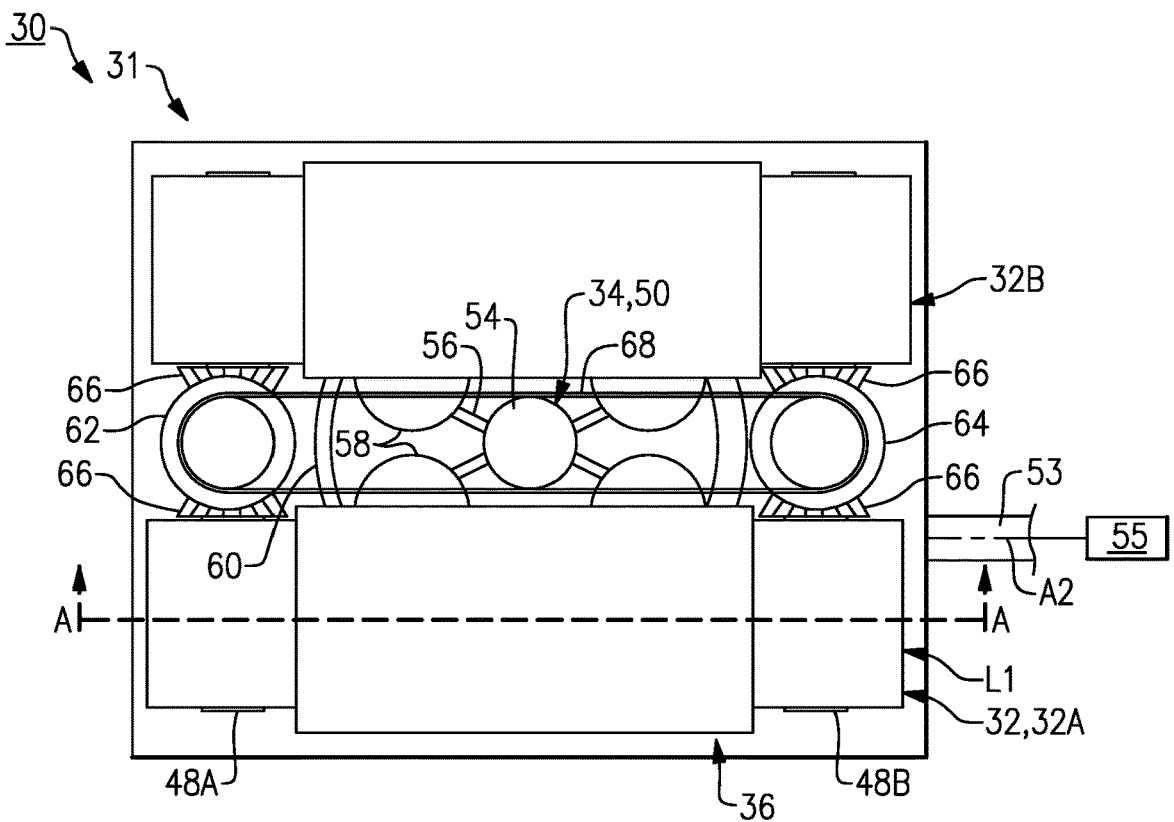
FIG. 2A is a top view of an actuation system according to a first embodiment.
Figure 2B:
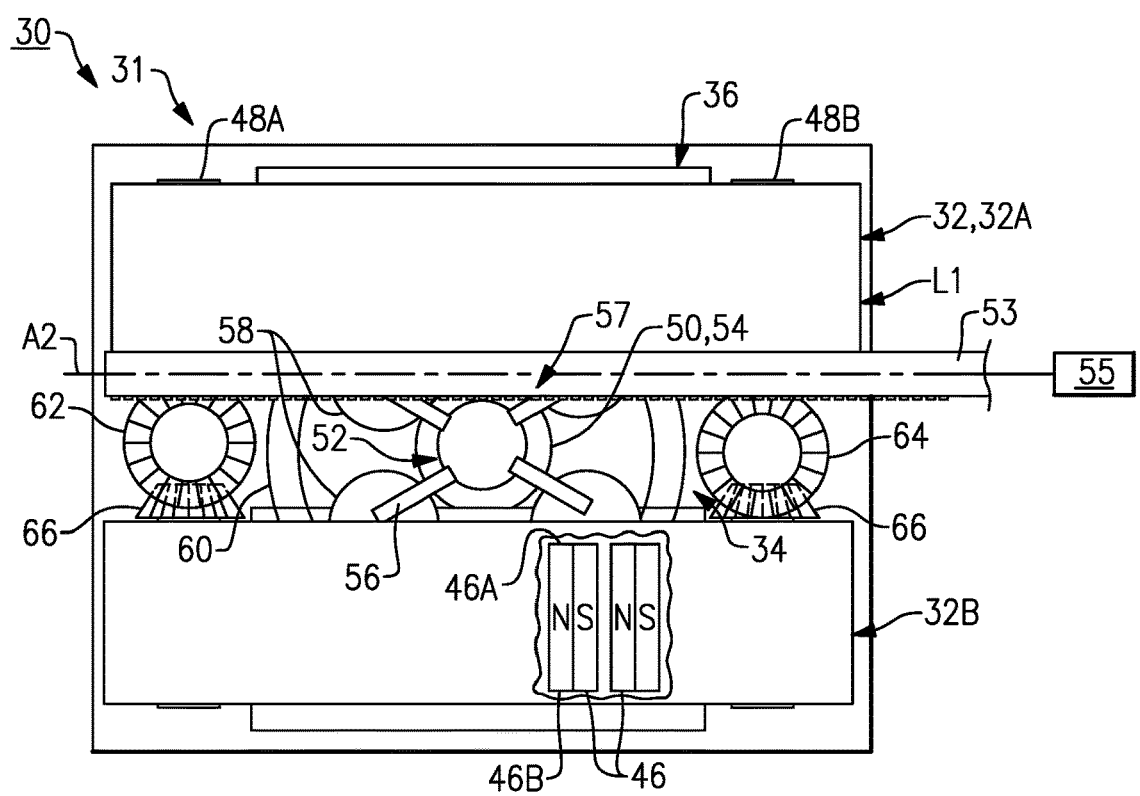
FIG. 2B is a bottom view of the actuation system of FIG. 2A.
Figure 2C:
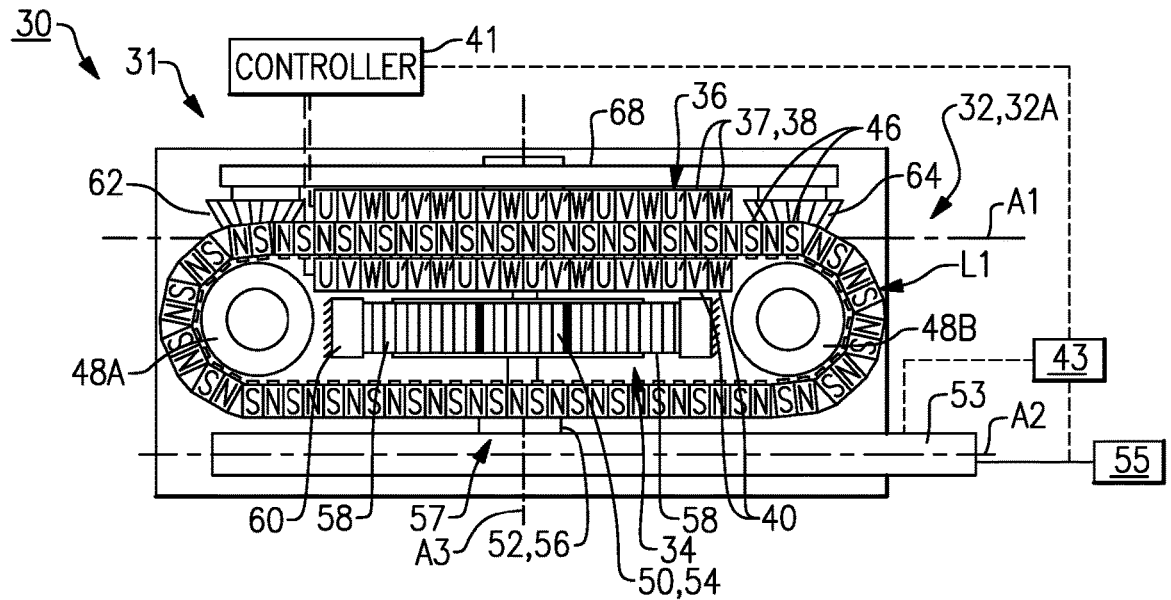
FIG. 2C is a sectional view of the actuation system along line A-A of FIG. 2A.

FIGS. 2A-2C illustrate an actuation system 30 according to a first embodiment. The actuation system 30 is operable to drive one or more components 55, such as pivotable flap F or another mechanical load 26 or component of the aircraft 20 (FIG. 1). In this disclosure, like reference numerals designate like elements where appropriate and reference numerals with the addition of one-hundred or multiples thereof designate modified elements that are understood to incorporate the same features and benefits of the corresponding original elements. Although the disclosure primarily discusses actuation of one or more aircraft components, other systems may benefit from the teachings herein, such as land-based power generation systems and marine vehicles.

The actuation system 30 includes an actuation assembly 31 and a linkage 53 that drives the component 55. The actuation assembly 31 includes a drive mechanism 32 and a gear train 34 to provide a linear motor function, for example. In the illustrated embodiment of FIGS. 2A-2C, the drive mechanism 32 is a duplex system including first drive mechanism 32A and second drive mechanism 32B. Each of the first and second drive mechanisms 32A, 32B drive the component 55 through the gear train 34. The first and second drive mechanisms 32A, 32B can provide dual redundancy and force magnification by dragging each other along during operation. In other embodiments, the drive mechanism 32 is a simplex system having only one of the first and second drive mechanisms 32A, 32B. The linkage 53 interconnects an output 52 of the gear train 34 and the component 55. In alternative embodiments, the linkage 53 is omitted and the output 52 of the gear train 34 is directly coupled to the component 55.

Each drive mechanism 32A/32B includes an armature 36. The armature 36 includes a plurality of armature windings 37 each including a first portion 38 and a second portion 40 (FIG. 2C). In the illustrated example, the windings 37 are three-phase windings having phases U, V, W or U', V', W'. The windings 37 can be arranged in a stacked relationship in an alternating pattern of U/V/W and U'/V'/W' phases. The armature 36 is electrically coupled to a controller 41. The controller 41 is operable to supply and modulate current to the windings 37 to cause the armature 36 to generate a series of electromagnetic fields along the series of windings 37.

The controller 41 can be coupled to a position feedback mechanism 43 for actuator control (FIG. 2C). The feedback mechanism 43 can be coupled or otherwise situated adjacent to linkage 53 or a portion of the component 55 to detect a relative position. The controller 41 is operable to adjust the current to the windings 37 in response to a sensed or detected position, with the controller 41 operable to compare the sensed position with an expected position. In some embodiments, the feedback mechanism 43 includes a linear displacement variable differential (LVDT) sensor, a resolver and an encoder, for example, to sense the position of the linkage 53 or the portion of the component 55. In other embodiments, the feedback mechanism 43 senses a relative position of a portion of the drive mechanism 32 or the gear train 34.

The drive mechanism 32 includes an array of magnetic members 46 that are moveable along a first axis A1 (FIG. 2C). The magnetic members 46 can be permanent magnets each having north and south poles N, S that are arranged in an alternating pattern (FIG. 2C). The armature 36 is operable to generate one or more electromagnetic fields between the windings 37 that interacts with a magnetic field of the magnetic members 46 to cause at least some of the magnetic members 46 to move along the first axis A1.

Figure 6:
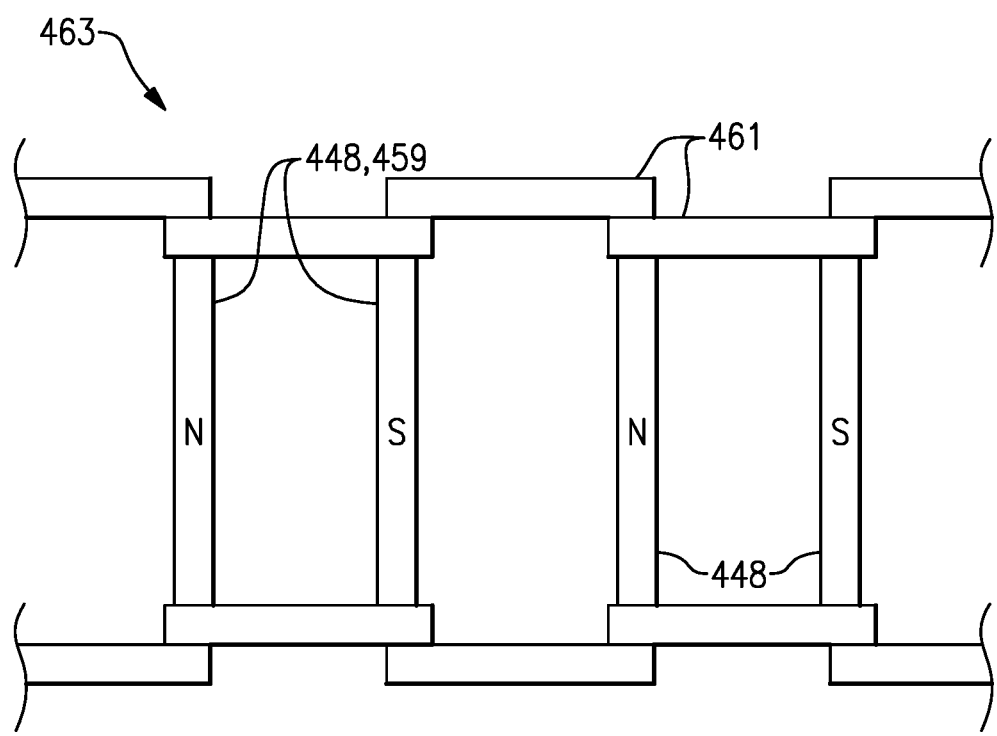
FIG. 6 illustrates an arrangement of magnetic members according to an embodiment.

In the illustrated example of FIGS. 2A-2C, the drive mechanism 32 is a linear motor having an infinite stroke length. The magnetic members 46 can be generally flexible and can be coupled in a loop configuration L1 about first and second pulleys 48A and 48B of the drive mechanism 32, with a length of the loop configuration L1 or circuitous path extending along the first axis A1. The magnetic members 46 can be carried in a rubber belt or another elastic polymeric material, for example. In the embodiment of FIG. 6, magnetic members 446 are a series of magnetic pins 459 that interconnect links 461 of a chain 463.

The loop configuration L1 defines an infinite stroke length and can achieve a relatively compact arrangement due to a circuitous path of the magnetic members 46. The infinite stroke length also increases the ability to amplify an actuation force imparted to the component 55, which may otherwise be limited in motor arrangements having a finite stroke length. A width of the magnetic members 46 between opposed sides 46A, 46B (shown in FIG. 2B) can be increased or decreased to generate relatively greater or lesser flux and actuation force.

Generation of the electromagnetic field causes the magnetic members 46 to move along the loop configuration L1 and about first and second pulleys 48A, 48B in response to interaction with the electromagnetic field(s). Portions of the loop configuration L1 pass between the first and second portions 38, 40 of the windings 37.

The gear train 34 includes an input 50 and output 52. The aircraft component 55 is moveable in response to driving the input 50. In the illustrated embodiment of FIGS. 2A-2C, the first and second drive mechanisms 32A, 32B each drive the input 50. In alternative embodiments, only one drive mechanism 32A/32B drives the input 50. The output 52 of the gear train 34 is mechanically coupled to the component 55 through the linkage 53. Movement of the output 52 of the gear train 34 causes the linkage 53 to move along second axis A2 to drive the component 55. The gear train 34 can define a gear reduction ratio for providing a desired force or torque reduction (or increase) between the input 50 and the output 52.

The gear train 34 can include an epicyclic gear system such as a star gear system (i.e., fixed carrier) or a planetary gear system (i.e., fixed ring gear). In the illustrated example of FIGS. 2A-2C, the gear train 34 is a planetary gear system that includes a sun gear 54, a carrier 56 coupled to a plurality of planetary gears 58, and a ring gear 60. The sun gear 54 defines the input 50, and the carrier 56 defines the output 52. The ring gear 60 is grounded to a static structure, and the carrier 56 pivots about a third axis A3 (FIG. 2C) to drive the linkage 53 through an interface 57. The interface 57 can include a plurality of meshing teeth, for example. In alternative embodiments, the gear train 34 is a star gear system with the ring gear 60 defining the output 52 and the carrier 56 grounded to a static structure. The loop configuration L1 at least partially surrounds and houses the carrier 56 to provide for a relatively thin and compact arrangement.

The gear train 34 interfaces with the drive mechanism 32 through a first spur gear 62, a second spur gear 64, and a pair of spur gears 66 that can be generally orthogonal to the first and second spur gears 62, 64. The first and second pulleys 48A, 48B are mechanically attached to respective spur gears 66, which drive the first and second spur gears 62, 64. In the illustrated example of FIGS. 2A-2C, the pair of spur gears 66 driven by the first drive mechanism 32A are coaxially aligned with respective spur gears 66 driven by the second drive mechanism 32B. The spur gears 66 drive the first and second spur gears 62, 64.

The spur gears 62, 64 drive the sun gear 54 through a belt drive 68 (FIG. 2A). The belt drive 68 can be situated between each of the first and second drive mechanisms 32A, 32B to provide for a relatively compact arrangement. In alternative embodiments, another portion of the gear train 34 defines the output 52, such as one of the spur gears 62, 64, 66.

Operation of the actuation system 30 is as follows. One or more electromagnetic fields are generated by windings 37 of the armature 36 to interact with the magnetic members 46 and to cause one or more of the magnetic members 46 to move along the first axis A1 to drive the input 50 of the gear train 34. Movement of the magnetic members 46 causes movement of the spur gears 66. Movement of the spur gears 66 causes rotation of the first and second spur gears 62, 64, which causes the belt drive 68 to move in a circuitous path to drive the sun gear 54. Movement of the sun gear 54 causes rotation of the planetary gears 58, which causes rotation of the carrier 56 about the axis A3. Rotation of the carrier 56 causes the linkage 53 to move in a generally linear direction along the axis A2 to actuate the component 55.

Figure 3:
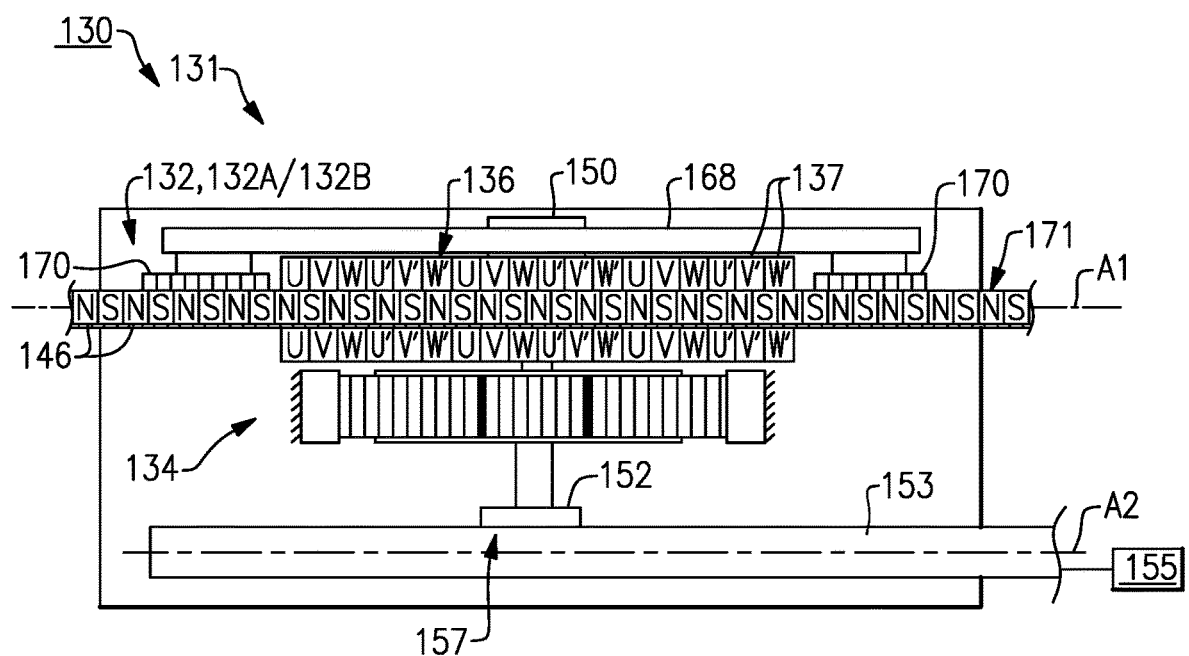
FIG. 3 is a side view of an actuation system according to a second embodiment.

FIG. 3 illustrates an actuation system 130 according to a second embodiment. The actuation system 130 includes first drive mechanism 132A and/or second drive mechanism 132B. Each drive mechanism 132A/132B includes an array of magnetic members 146 mechanically coupled to each other in a generally planar geometry. The magnetic members 146 can be guided along a track 171 that extends along first axis A1, for example. The magnetic members 146 are moveable along the first axis A1 to provide a linear motor function and to rotate a pair of gears 170 of gear train 134. Rotation of the gears 170 causes rotation of belt drive 168, which drives an input 150 of the gear train 134. Rotation of the input 150 causes rotation of output 152 of the gear train 134, which drives linkage 153 along second axis A2.

Figure 4A:
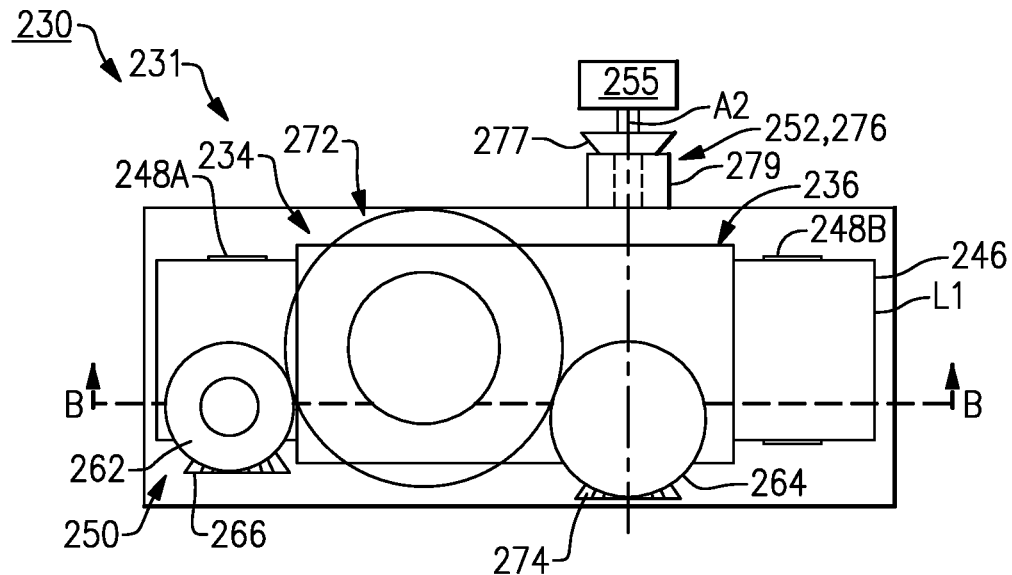
FIG. 4A is a top view of an actuation system according to a third embodiment.
Figure 4B:
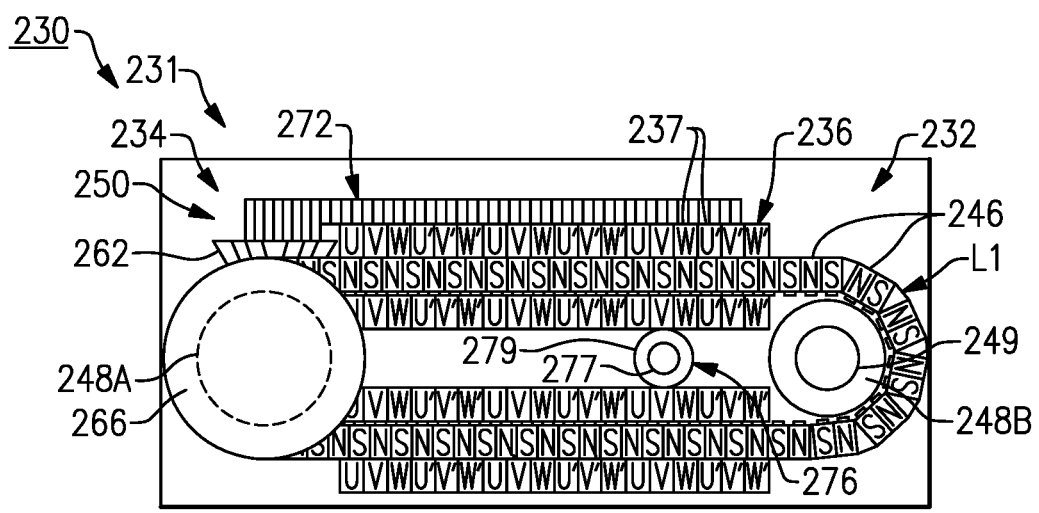
FIG. 4B is a sectional view of the actuation system along line B-B of FIG. 4A.

FIGS. 4A and 4B illustrate an actuation system 230 according to a third embodiment. An array of magnetic members 246 are arranged in a loop configuration L1 about first and second pulleys 248A, 248B. The second pulley 248B can include an idler 249 to provide a desired amount of tension on the magnetic members 246 to engage or disengage the drive mechanism 232.

Gear train 234 includes a first spur gear 262, a second spur gear 264, a third spur gear 266, and a fourth spur gear 274 (FIG. 4A). The first pulley 248A is coupled to the third spur gear 266, which drives the first spur gear 262. The first spur gear 262 defines an input 250 of the gear train 234. Gear train 234 can include a reduction stage 272 that defines a gear reduction ratio. The reduction stage 272 interconnects the first and second spur gears 262, 264. The second spur gear 264 drives the fourth spur gear 274, which drives a ball screw assembly 276 that defines output 252 of the gear train 234. The ball screw assembly 276 includes a rotatable screw or shaft 277 that supports a rotatable nut or sleeve 279. The sleeve 279 is translatable about the shaft 277 and along second axis A2 to drive component 255 with a generally linear or rotary motion.

Figure 5:
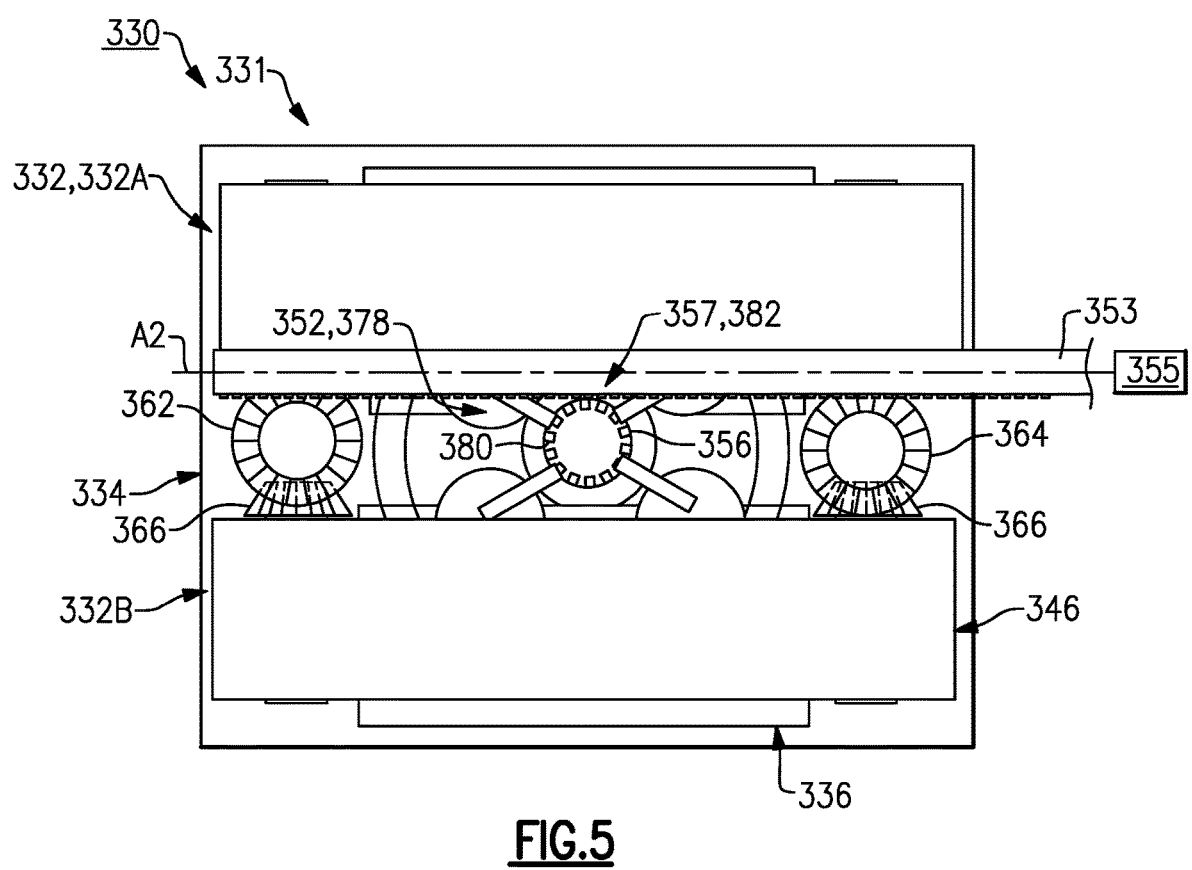
FIG. 5 is a bottom view of an actuation system according to a fourth embodiment.

FIG. 5 illustrates an actuation system 330 according to a fourth embodiment. Gear train 334 drives linkage 353 through interface 357. The interface 357 is a worm gear 378 defined by an output 352 of the gear train 334 and linkage 353. Carrier 356 of the gear train 334 defines a worm wheel 380 that interfaces with a worm screw 382 defined by the linkage 353. The linkage 353 is operable to rotate about, and traverse along, axis A2 to actuate component 355 with a generally linear or rotary motion.

The controller 41 typically includes a processor, a memory and an interface. The processor may, for example only, be any type of known microprocessor having desired performance characteristics. The memory may, for example only, includes UVPROM, EEPROM, FLASH, RAM, ROM, DVD, CD, a hard drive, or other computer readable medium which may store data for operation of the controller 41 of this description. The interface facilitates communication with the other systems or components of the aircraft, for example.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of actuating an aircraft component comprising:
    coupling at least one drive mechanism to a gear train, wherein the at least one drive mechanism includes an armature and an array of magnetic members moveable along a first axis, the armature includes a plurality of armature windings, the gear train includes an input and an output, and including coupling the output of the at least one drive mechanism to the input of the gear train;
    interconnecting an aircraft component and the output of the gear train via a linkage;
    generating one or more electromagnetic fields between the plurality of armature windings to cause the array of magnetic members to move along the first axis to drive the input of the gear train; and
    moving an aircraft component in response to driving the input of the gear train, including moving the output of the gear train to cause the linkage to move along a second axis.

2. The method as recited in claim 1, wherein the first axis is offset from the second axis.

3. The method as recited in claim 1, wherein the at least one drive mechanism includes a first drive mechanism and a second drive mechanism each driving the input of the gear train in response to the step of generating the one or more electromagnetic fields.

4. The method as recited in claim 1, further comprising moving the array of magnetic members along a circuitous path in response to the step of generating the one or more electromagnetic fields, wherein a length of the circuitous path extends along the first axis.

5. The method as recited in claim 4, wherein the gear train is an epicyclic gear system.

6. The method as recited in claim 5, wherein the epicyclic gear system includes a sun gear, a carrier coupled to a plurality of planetary gears, and a ring gear, wherein the sun gear defines the input, and the carrier or the ring gear defines the output.

7. The method as recited in claim 6, wherein the gear train defines a worm gear, with the carrier defining a worm wheel that interfaces with a worm screw, and the step of generating the one or more electromagnetic fields includes the worm screw driving the aircraft component.

8. The method as recited in claim 1, wherein the at least one drive mechanism is a linear motor defining an infinite stroke length, with the array of magnetic members coupled in a loop configuration about first and second pulleys.

9. The method as recited in claim 8, wherein the gear train is an epicyclic gear system including a sun gear, a carrier coupled to a plurality of planetary gears, and a ring gear, wherein the sun gear defines the input, and wherein the carrier or the ring gear defines the output.

10. The method as recited in claim 9, wherein the carrier defines the output.

11. The method as recited in claim 9, wherein the ring gear defines the output.

12. The method as recited in claim 9, wherein the loop configuration passes between first and second portions of the armature windings, and the loop configuration at least partially surrounds the carrier.

13. The method as recited in claim 12, wherein the first axis is offset from the second axis.

14. The method as recited in claim 8, wherein the first pulley is coupled to a first spur gear, the second pulley is coupled to a second spur gear, and the first and second spur gears drive the sun gear through a belt drive in response to the step of generating the one or more electromagnetic fields.

15. The method as recited in claim 14, wherein the at least one drive mechanism includes a first drive mechanism and a second drive mechanism, and each of the first and second drive mechanisms drives the sun gear in response to the step of generating the one or more electromagnetic fields.

16. The method as recited in claim 15, wherein the first and second drive mechanisms each have a pair of spur gears that drive the first and second spur gears, respectively, in response to the step of generating the one or more electromagnetic fields.

17. The method as recited in claim 16, wherein the aircraft component is a flap, and the step of moving the aircraft component includes pivoting the flap in response to causing the linkage to move along the second axis.

18. The method as recited in claim 1, wherein gear train includes a reduction stage interconnecting first and second spur gears, the first spur gear defines the input, and the step of generating the one or more electromagnetic fields includes the second spur gear driving a ball screw that defines the output.

19. The method as recited in claim 1, wherein the array of magnetic members include a series of magnetic pins that interconnect lines of a chain.

20. The method as recited in claim 1, wherein the aircraft component is a flap, and the step of moving the aircraft component includes pivoting the flap in response to causing the linkage to move along the second axis.

* * * * *